United States Patent [19]
Archibald et al.

[11] 3,875,165
[45] Apr. 1, 1975

[54] (4-QUINOLYLAMINO)-(N-PIPERIDYL)BENZAMIDES AND N-[(4-QUINOLYLAMINO)BENZOYL]-PIPERIDINES

[75] Inventors: John Leheup Archibald, Windsor; John Terence Arnott Boyle; John Christopher Saunders, both of Maidenhead, all of England

[73] Assignee: John Wyeth & Brother Limited, Maidenhead, England

[22] Filed: Feb. 22, 1973

[21] Appl. No.: 334,799

[52] U.S. Cl...... 260/287 R, 260/247.2, 260/293.53, 260/293.69, 260/293.76, 260/293.88, 260/293.87, 260/283 S, 260/286 R, 260/326.82, 260/326.5 G, 260/332.2 C, 260/326.85, 424/258, 424/248
[51] Int. Cl............................................ C07d 33/54
[58] Field of Search ................................. 260/287 R

[56] References Cited
UNITED STATES PATENTS

| | | | |
|---|---|---|---|
| 3,132,145 | 5/1964 | Allais | 260/287 R |
| 3,632,761 | 1/1972 | Graham | 260/287 R |
| 3,644,368 | 2/1972 | Allais | 260/287 R |

FOREIGN PATENTS OR APPLICATIONS

| | | | |
|---|---|---|---|
| 519,019 | 11/1955 | Canada | 260/287 |

*Primary Examiner*—Donald G. Daus
*Assistant Examiner*—D. Wheeler
*Attorney, Agent, or Firm*—Dwight J. Potter

[57] ABSTRACT

The disclosure describes new 4-aminoquinoline derivatives of general formula

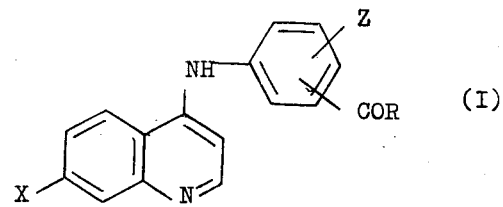

and their acid addition salts, where X is a halogen atom or a trifluoromethyl group, Z is a hydrogen atom or a defined substituent, R is group of the formula

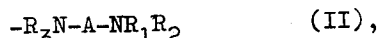 (II),

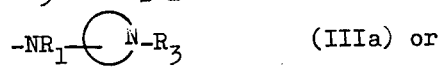 (IIIa) or

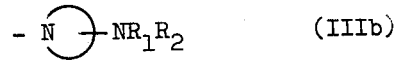 (IIIb)

where A in formula II is a chain of 1 to 5 methylene groups which may be substituted with alkyl, the ring in formula IIIa and IIIb is a piperidine or pyrrolidine ring that may be substituted with alkyl and $R_1$, $R_2$ and $R_3$ represent hydrogen or certain defined substituents. The new 4-aminoquinoline derivatives show anti-malarial activity and, in some cases, shows one or more of the following activities: anti-inflammatory activity, anti-hypertensive activity, anti-trichomonal activity, inhibition of blood platelet aggregation, anti-ulcer activity and activity against allergic asthma.

12 Claims, No Drawings

(4-QUINOLYLAMINO)-(N-PIPERIDYL)-BENZAMIDES AND N-[4-QUINOLYLAMINO)-BENZOYL]PIPERIDINES

The present invention concerns new 4-aminoquinoline derivatives, a process for their preparation and pharmaceutical compositions containing them.

The invention provides new 4-aminoquinoline derivatives of the general formula

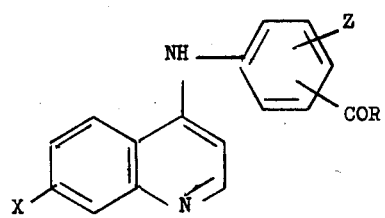

(I)

and their acid addition salts, where i. X is a halogen atom or a trifluoromethyl group;
ii. Z is a hydrogen atom or a halogen atom, a trifluoromethyl group, a lower alkyl group, a lower alkoxy group, a hydroxyl group, a nitro group, an amino group or a mono- or di-alkyl substituted amino group, and
iii. R represents a group of the formula
—$NR_3$—A—$NR_1R_2$—(II)
or

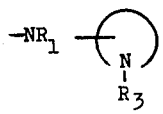 or 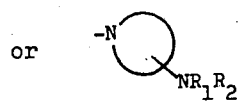

(IIIa)  (IIIb)

wherein a. in formula II A represents a chain of 1 to 5 methylene groups, which may be substituted by one or more alkyl groups;
b. in formula IIIa and IIIb the ring denotes a piperidine or pyrrolidine ring that may be substituted by one or more alkyl groups or by a divalent aliphatic chain substituting two different ring members of the piperidine or pyrrolidine ring;
c. $R_1$ represents a hydrogen atom, an alkyl group, an aralkyl group, an acyl group or an aryl group or, in formula II or IIIb, $R_1$ and $R_2$ may together form the diacyl residue of a dicarboxylic acid or $R_1$ and $R_2$ may together form a divalent radical such that $R_1R_2NH$ is a secondary cyclic amine with 5 to 7 ring atoms;
d. $R_2$ is as defined above in connexion with $R_1$ or represents a hydrogen atom, an alkyl group, an aralkyl group or an acyl group; and
e. $R_3$ represents a hydrogen atom, an alkyl group, an aralkyl group, or an alkyl group substituted by a heterocyclic group, or an aliphatic chain joining the nitrogen atom member to another ring member of the ring in formula IIIa.

It will be apparent to those skilled in the art that the above definition of R includes moieties possessing an asymmetric carbon atom, especially for instance, in the cases where 1. A is linear chain of 1 to 5 methylene groups, the chain being monosubstituted by methyl or ethyl, or
2. R is of the formula IV or V

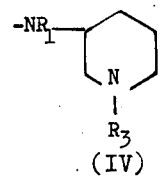 or 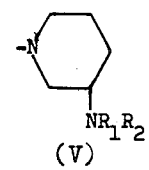

(IV)  (V)

for example, in the cases where R denotes groups of the formula

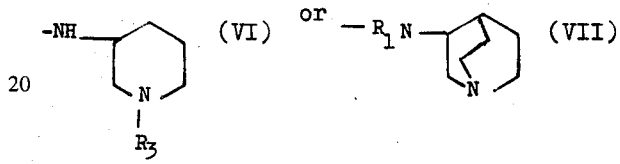

where $R_1$, $R_2$ and $R_3$ may be, for instance, hydrogen or lower alkyl. It is to be understood that general formula I is intended to encompass both enantiomers where the compound contains an asymmetric carbon atom and mixtures of the enantiomers, for instance, a racemic mixture of the enantiomers. General methods are recorded in the literature for the resolution of enantiomers.

In the compounds of the invention, X preferably represents a halogen atom, for example, a chlorine or bromine atom, but may also represent a trifluoromethyl group. Illustrative meanings of Z include hydrogen, chlorine, bromine atoms and trifluoromethyl, lower alkyl or alkoxy (for example, methyl, ethyl, propyl, butyl, methoxy, ethoxy, propoxy and butoxy), hydroxyl, nitro, amino, methylamino, ethylamino, dimethylamino and diethylamino groups.

In formula I the group denoted by —COR is preferably in the m- or p- position, advantageously the p-position, with respect to the 7-(halo or trifluoromethyl)-4-quinolylamino group.

In formulae II and IIIb $R_1$ and $R_2$ may be separate or may be joined together to form a divalent residue. The divalent residue is a diacyl residue of a dicarboxylic acid, for example, a group of the formula —$CO.(CH_2)_nCO.$— where $n$ is 2 or 3 or

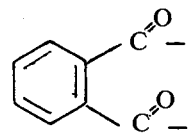

or is such that $R_1R_2NH$ is a secondary cyclic amine with 5 to 7 ring atoms, for instance, piperidine, pyrrolidine or morpholine.

$R_1$, when in formula IIIa or when separate from $R_2$ in formula II or IIIb, represents a hydrogen atom, an alkyl group, an aralkyl group, an acyl group or an aryl group, $R_2$, when separate from $R_1$ in formulae II and IIIb, represents a hydrogen atom, an alkyl group, an aralkyl group or an acyl group. $R_3$ in formula II and IIIa represents a hydrogen atom, an alkyl group, an aralkyl group, or an aliphatic chain joining the nitrogen ring atom to another ring shown in formula IIIa. Illustrative examples of such groups that can be denoted by $R_1$, $R_2$ or $R_3$ will now be described. Alkyl groups are desirably lower alkyl groups, for example, methyl, ethyl, n- or i-propyl and n-butyl. Aryl groups particularly comprehend phenyl or phenyl substitued by one or more substituents. As substituents for a phenyl group there may be employed lower alkyl (for example, methyl, ethyl, propyl or butyl), lower alkoxy (for example, methoxy, ethoxy, propoxy or butoxy), nitro, halogen, (preferably chlorine or bromine), hydroxy, trifluoromethyl or amino (including mono- or dialkylamino, for instance, dimethylamino). Aralkyl groups are aryl-substituted alkyl groups, where the alkyl group is desirably a lower alkyl group (e.g. methyl, ethyl, propyl or butyl) and its aryl substituent may be phenyl or substituted phenyl, in which the one or more substituents for phenyl are as mentioned above. Acyl groups particularly include the acyl groups of the formula —$CO.R_5$ where $R_5$ represents alkyl or aryl. As specific acyl groups there may be mentioned for example, acetyl, propionyl, butanoyl, hexanoyl, benzoyl and benzoyl substituted by one or more of the above mentioned substituents for phenyl. As alkyl substituted by a heterocyclyl group there may be mentioned lower alkyl such as methyl, ethyl, propyl or butyl, substituted by thienyl (for instance 2-thienyl), furyl, pyrrolyl, imidazolyl, pyrazolyl (for instance 4-pyrazolyl), indolyl, pyridyl (for instance 2- or 4-pyridyl), quinolyl, thiazolyl (specifically 2-, 4-or 5-thiazolyl), isothiazolyl or oxazolyl.

As examples of A in formula II there may be mentioned methylene, dimethylene, trimethylene, tetra-methylene, and pentamethylene and their mono- or di-(lower alkyl) substitution products, for example, groups of the formulae

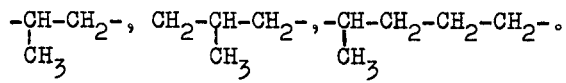

The piperidine or pyrrolidine ring shown in formulae IIIa and IIIb may be substituted with one or more alkyl groups, preferably lower alkyl groups, for example, methyl, ethyl, propyl or butyl. As examples of R containing a piperidine or pyrrolidine ring there may be mentioned groups of the formula:

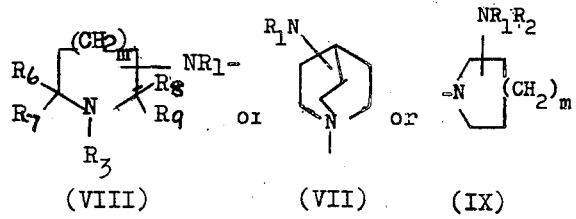

where $m$ is 0 or 1; $R_1$, $R_2$ and $R_3$ are as defined above; and $R_6$, $R_7$, $R_8$ and $R_9$, which may be the same or different may be hydrogen or lower alkyl, for instance, methyl, ethyl, propyl or butyl.

The term "lower" as used herein connexion with such groups as "alkyl" or "alkoxy" denotes that the group contains up to 6 carbon atoms.

Examples of acid addition salts are those formed from inorganic and organic acids and in particular pharmaceutically acceptable acid addition salts such as the sulphate, hydrochloride, hydrobromide, hydroiodide, nitrate, phosphate, sulphonate (such as the methanesulphonate and p-toluene-sulphonate), acetate, maleate, fumarate, tartrate, malonate, citrate and formate.

The compounds of the invention may be made by building the compound up by known reactions. In particular the amide linkage shown in formula I as —COR may be formed by acylation of an appropriate amine, and a primary amino-substituted benzamide may be converted to the secondary amine by introducing the 7-(halo or trifluoromethyl)-4-quinolyl group in known manner.

The invention provides a method of making compounds of the formula I and their acid addition salts, wherein a. a compound of the formula RH, where R is as defined in connexion with formula I, or, where necessary or desired, a corresponding compound with a protecting group, or a corresponding compound with an activated amino group, is acylated with a compound of formula (XIII)

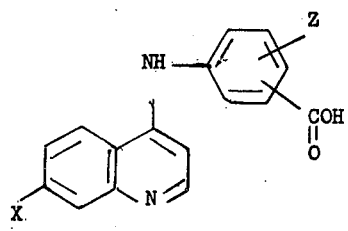

(wherein X and Z are as defined above in connexion with formula I), or a corresponding compound with a protecting group, or a reactive derivative of the compound of formula (XIII) or its corresponding compound with a protecting group; or b. a compound of the formula XIV

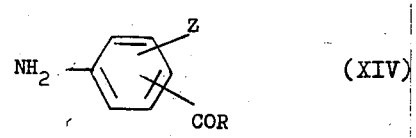

(where R and Z are as defined in connexion with formula I) or a corresponding compound with a protecting group, is reacted with a compound of formula (XV)

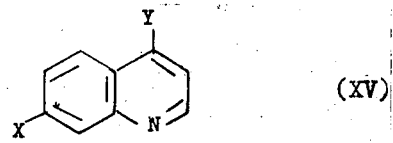

(where X is as defined above in connexion with formula I and Y denotes a group or atom replaceable by nucleophilic attack by compound of formula XIV). Y is for example, an iodine atom, a bromine atom or a chlorine atom or an organosulphonyl group, for instance, p-toluenesulphonyl. Where necessary or if desired, the process may also include removal of a protecting group and, if desired, conversion of a free base form of compound of formula I into an acid addition salt form or conversion of an acid addition salt form of a compound of formula I into the corresponding free base form.

Starting materials of formula RH and formulae XIV and XV are known compounds or, if new, are accessible by conventional methods.

The acylation method may be carried out by reacting the compound of formula XIII with the compound of formula RH or a corresponding compound with a protecting group, in the presence of a condensing agent, for instance, a carbodiimide. Alternatively the acid of formula XIII may be reacted with a compound in which an amino function has been activated, for example, by forming the phosphazo derivative. The reactive acylating derivatives of the compound of formula XIII may be employed, for example, active esters, acyl halides, simple or mixed anhydrides and the acid azide. The acid halides, particularly the acid chloride are especially suitable. The acylation product may be recovered from the reaction mixture by standard isolation procedures.

It will be apparent to those skilled in the art that certain unacylated compounds of formula RH may present more than one potentially reactive location for acylation. Undesired acylation may be avoided by chemical protection with removable blocking groups or other means. For example, the compounds of the formula

     (XVI)

(where $m$ is 0 or 1) may be acylated at the NH₂ function by forming a derivative with an activated amino group, for example, the phosphazo derivative, and reacting said derivative with the acid of formula XIII. Alternatively the compounds of formula XVI may be acylated at the ring nitrogen atom by using a starting material in which the NH₂ function is protected with a blocking group which is removed after acylation. Compounds of formula I and their acid addition salts, in which, in formula IIIa, R₃ denotes hydrogen, may be prepared by using, for example, a benzyl group as removable protecting group. Thus a starting compound of formula

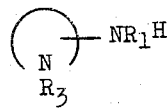

in which R₃ is benzyl is acylated and the protecting group is removed after acylating by debenzylation. Debenzylation may be carried out using sodium in liquid ammonia or by catalytic hydrogenation under conditions such that the 7-halo- or 7-trifluoromethyl substituent on the quinolyl group is not removed. In addition, compounds of formula RH include compounds where a substituent on an aryl group or heterocyclyl group is susceptible to acylation, e.g. a free hydroxyl or amino substituent. Such substituents may be protected with a removable blocking group which is cleaved off after acylation. Acylating derivatives of the acid of formula XIII may include protection for a group Z sensitive to acylation. For example, a final product in which Z is an amino function can be formed by using an acylating derivative of the acid of formula

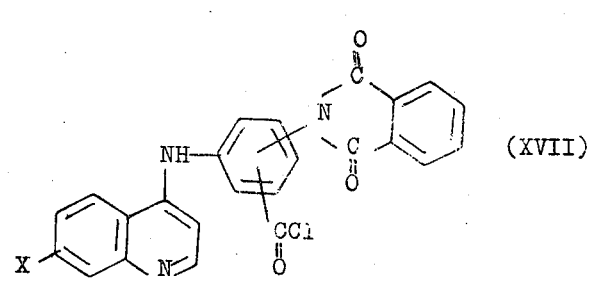     (XVII)

and converting the phthalimido group to an —NH₂ group by reaction with hydrazine. The new compounds of the invention are normally quite stable to hydrolysis under acid conditions and therefore favour protecting groups that are readily hydrolysed off under acid conditions.

Compounds of the formula XIV are accessible in standard manner, for example, by acylation of a compound of formula RH where R has the meanings given in connexion with formula I with an acylating derivative of a nitrobenzoic acid or (protected amino) benzoic acid and subsequent reduction of the nitro group or removal of the amino protecting group. The reaction of the primary amine XIV with the compound of formula XV may be carried out in conventional manner for amination of 4-substituted quinolines. The reaction products may be recovered from the reaction mixtures by standard isolation procedures. In certain cases it is expedient to incorporate a protecting group for amino in the compound of formula XIV to reduce or preclude undesired reaction of the compounds of formula XV with a primary or secondary amino function in the group R. In such cases the protecting group is removed after the reaction with the compound of formula XV.

The compounds of the present invention may be isolated in free base form or as acid addition salts. Acid addition salts may be converted into the free bases in conventional manner. The free base forms may be converted into acid addition salts in conventional manner, for instance, by adding ethereal hydrogen chloride to a solution of the free base where a hydrochloride salt is desired.

The compounds of the present invention are indicated for pharmacological usage and, in some cases, for use as intermediates for the preparation of other compounds of formula I. For instance, the compounds of the invention generally demonstrate anti-malarial activity and, in some cases, also demonstrate at least one of the following activies: anti-inflammatory activity, anti-hypertensive activity, anti-trichomonal activity, inhibition of blood platelet aggregation, anti-ulcer activity and activity against allergic asthma. The anti-malarial activity is particularly interesting, especially since the anti-malarial compounds of the invention generally possess the advantage of being less toxic than chloroquine, a known anti-malarial compound, in such test animals as mice. The inhibition of blood platelet aggregation demonstrated by 3-(p-[7-chloro-4-quinolylamino]benzamido)-1-ethylpiperidine is also particularly interesting. Some of the compounds of the invention may also be used as intermediates for the preparation of other compounds conforming with formula I. For example, compounds containing a phthalimido group as $-NR_1R_2$ in formula II or IIIb may be subjected to cleavage using hydrazine to form a corresponding compound containing an amino group ($-NH_2$) as $-NR_1R_2$ and compounds containing an amino group may be alkylated to form a corresponding compound with an alkyl-substituted amino group.

The compounds can be tested for anti-malarial activity by the following procedure:

Five mice are infected with a lethal dose of *Plasmodium Berghei* three days prior to administration of the compound at various dose levels. The compound test dose is in milligrams per kilogram of body weight. Routinely, the compounds are administered subcutaneously in oil.

Extension of the survival time beyond the mean survival time of infected control mice is interpreted as evidence of anti-malarial activity. A 60 day survival time is regarded as evidence of a cure.

The invention also includes pharmaceutical compositions containing as active ingredients a compound of formula (I) or a pharmaceutically acceptable acid addition salt thereof, which may be micronised if desired. In addition to the active ingredient, said compositions also contain a non-toxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

The invention is illustrated by the following Examples:

EXAMPLE 1

3-[p-(7-Chloro-4-quinolylamino)benzamido]-1-ethyl-piperidine p-(7-Chloro-4-quinolylamino)-benzoyl chloride hydrochloride (from 6.0 grams of the acid) is added in portions to a stirred ice-cooled solution of 2.6 grams of 3-amino-1-ethyl-piperidine in 40 millilitres of chloroform with 21.2 grams of sodium carbonate in 40 millilitres of water present. The reaction mixture is then stirred overnight at room temperature and filtered to give a crude product which is washed with water and filtered again giving a yellow solid. This is dissolved in hot ethanol and on addition of ethereal hydrogen chloride, gives the hydrochloride of the title compound (4.0 grams). Melting point 282°C. with decomposition.

Analysis: Found 57.2%C, 5.8%H; 11.5%N; $C_{23}H_{25}ClN_4.2HCl$ requires 57.3%C, 5.7%H, 11.6%N.

EXAMPLE 2

1-Benzyl-4(p-[7-chloro-4-quinolylamino]-benzamido)-piperidine p-(7-Chloro-4-quinolylamino)-benzoyl chloride hydrochloride (from 29.9 grams of the acid) is added as a chloroform suspension to 18.4 grams of 4-amino-1-benzylpiperidine in 200 millilitres of chloroform with 30.0 grams of potassium bicarbonate in 200 millilitres of water present, while the mixture is being stirred and cooled in an icebath. After stirring for a further eight hours the reaction mixture is filtered, to give the crude product. This is recrystallised from methanol, and dissolved in ethanolic hydrogen chloride and addition of acetone causes the crystallisation of the hydrochloride of the title compound, (17.6 grams).

Melting point 274°C with decomposition.

Analysis: Found, 60.8%C, 5.4%H, 9.9%N; $C_{28}H_{27}ClN_4.2HCl.½H_2O$ requires 60.8%, 5.5%H, 10.1%N.

EXAMPLE 3

1-[p-(Chloro-4-quinolylamino)-benzoyl]-4-dimethylamino piperidine

A suspension of p-(7-chloro-4-quinolylamino)-benzoyl chloride hydrochloride (from 6.0 grams of the acid) in chloroform is added to a stirred ice-cooled solution of 4-dimethylaminopiperidine (4.0 grams of the dihydrochloride) in 40 millilitres of chloroform with 21.2 grams of sodium carbonate in 40 millilitres of water present. The mixture is stirred overnight at room temperature, filtered and the chloroform layer separated and combined with further chloroform washings of the aqueous layer. The chloroform solution is dried and evaporated to give a yellow solid. This is purified by twice recrystallising as the hydrochloride, and regenerating the free base (2.9 grams). Melting point, 236°C with decomposition.

Analysis: Found, 67.8%C, 6.3%H, 13.6%N; $C_{23}H_{25}ClN_4O$ requires 67.6%C, 6.2%H, 13.7%N.

EXAMPLE 4

4-Benzamido-1-[p-(7-chloro-4-quinolylamino)-benzoyl]-piperidine

A solution of 2.04 grams of 4-benzamido-Piperidine and 5.0 grams of triethylamine in 20 millilitres of dimethylformamide is added to solid p-(7-chloro-4-quinolylamino)-benzoyl chloride hydrochloride (from 3.0 grams of the acid), with stirring and cooling. After stirring overnight at room temperature the reaction mixture is poured into water and the crude product filtered off. This is dissolved in isopropanol and treated with ethereal hydrogen chloride to give the crystalline hydrochloride of the title compound (2.9 grams) Melting point, 195°C with decomposition.

Microanalysis: Found, 61.9%C, 5.2%H, 10.0%N; $C_{28}H_{25}ClN_4O_2$. $HCl.H_2O$ requires 62.3%C, 5.2%H, 10.39%N.

EXAMPLE 5

1-[p-(7-chloro-4-quinolylamino)-benzoyl]-4-(N-propionanilido)-piperidine

A suspension of p-(7-chloro-4-quinolylamino)-benzoyl chloride hydrochloride (from 3.0 grams of the acid) in chloroform is added slowly to a stirred ice-cooled solution of 2.3 grams of 4-(N-propionanilido)-piperidine in 50 millilitres of chlorofrom with 4.0 grams of potassium bicarbonate in 50 millilitres of water present. After stirring for two hours at room temperature the reaction mixture is filtered. The aqueous layer of the filtrate is separated from the chloroform layer, and the chloroform layer subsequently combined with chloroform washings of the aqueous layer, and then dried and evaporated to give a yellow solid. This is dissolved in ethanol and treated with ethereal hydrogen chloride and the solid thus obtained is recrystallised from ethanol/ether to give the hydrochloride of the title compound (3.6 grams). Melting point 271°C with decomposition.

Microanalysis: Found, 64.9%C, 6.2%H, 9.3%N; $C_{30}H_{29}ClN_4O_2$. HCl.EtOH requires 64.5%C, 6.1%H, 9.43%N).

EXAMPLE 6

In this Example, illustrating pharmaceutical compositions, all parts are by weight.

a. Tablets may be made by dry granulation from the following formulation:

| | |
|---|---|
| Active ingredient(for instance the title compound of Example 1, 2 or 3 as its hydrochloride | 250 parts (active ingredient), |
| Calcium phosphate dibasic dihydrate | 280 parts (compressible base), |
| Methyl cellulose 450 B.P. | 30 parts (dry binder), |
| Magnesium stearate B.P. | 15 parts (lubricant), |
| Maize starch dried B.P. | 75 parts (disintregrant) |
| | 600 parts |

The powders are dry mixed and slugged, the slugs are dry granulated, and the granules are mixed ready for compression and compressed.

b. Tablets may be made by direct compression from the followoing formulation:

| | |
|---|---|
| Title compound of Examples 1, 2 or 3 (as its hydrochloride) | 250 parts (active ingredient) |
| Celutab (1) | 325 parts (direct compression base) |
| Primojel (2) | 15 parts (disintegrant) |
| Magnesium stearate | 10 parts (lubricant) |
| | 600 parts |

The tablets are made by dry mixing and compression.

(1) "Celutab" is a Trade Mark for a maltose-dextrose mixture.
(2) "Primojel" is a Trade Mark for sodium-starch-glycolate.

EXAMPLE 7

1-Ethyl-3-(7-chloro-4-quinolylamino)-benzamido]-piperidine 0.286 Gram of 4,7-Dichloroquinoline and 0.356 gram of 3-(p-aminobenzamido)-1-ethyl-piperidine were heated together under reflux in glacial acetic acid for five minutes and then heated on a steam bath for two hours. The resulting mixture was poured into water, filtered, and basification of the filtrate gave 0.23 grams of a white solid (title compound). This was dissolved in ethanol, treated with ethanolic hydrogen chloride and crystallised on addition of ether. One further recrystallisation of this material from ethanol/ether gave 0.105 grams of the title compound as its dihydrochloride. The infra-red spectrum of the dihydrochloride prepared according to this Example showed no significant differences from a sample prepared by the route of Example 1.

EXAMPLE 8

The following compounds may be made by the procedure of Example 7 from 4,7-dichloroquinoline and the appropriate p-aminobenzoic acid amide:

1-Benzyl-4-[p-(7-Chloro-4-quinolylamino)benzamido]-piperidine, whose dihydrochloride has a melting point of 274°C with decomposition.

1-[p-(7-Chloro-4-quinolylamino)-benzoyl]-4-dimethylamino piperidine, whose free base form has a melting point of 236°C.

4-Benzamido-1-[p-(7-chloro-4-quinolylamino)-benzoyl]-piperidine, whose hydrochloride monohydrate has a melting point of 195°C with decomposition.

1-[p-(7-Chloro-4-quinolylamino)-benzoyl]-4-(N-propionanilido)-piperidine, whose hydrochloride from recrystallisation from ethanol/ether has a melting point of 271°C with decomposition.

4-[p-(7-Chloro-4-quinolylamino)-benzamido]-1-(2-indol-3-ylethyl)-piperidine, whose dihydrochloride hemihydrate decomposes above 275°C.

4-[p-(7-Chloro-4-quinolylamino)-benzamido]-1-methyl-piperidine, whose melting point is 250.5°C with decomposition.

4-[p-(7-chloro-4-quinolylamino)-benzamido]-1-phenethyl-piperidine, whose dihydrochloride monohydrate melts at 287°–291°C with decomposition.

EXAMPLE 9

4-[p-(7-Chloro-4-quinolylamino)-benzamido]-1-(2-indol-3-ylethyl)piperidine 5.97 grams of p-(7-Chloro-4-quinolylamino)-benzoic acid were refluxed five hours with thionyl chloride (40 ml.) to generate the acid chloride hydrochloride. After the thionyl chloride had been removed on a rotary evaporator, the acid chloride hydrochloride was added in portions to an ice-cooled mixture of 5.27 grams of 4-amino-1-(2-indol-3-ylethyl)-piperidine and 27.6 grams of potassium carbonate in 100 millilitres of water and 100 millilitres of chloroform. The reaction mixture was stirred for eighteen hours at room temperature and filtered to give 11.7 grams of a yellow solid which was washed with 500 millilitres of water and filtered to remove inorganic material. This solid was converted to the hydrochloride with ethanolic hydrogen chloride and this salt was recrystallised from ethanol/ether to give 7.1 grams of the dihydrochloride hemihydrate of the title compound.

Melting point: Compound decomposes above 275°C.

Analysis: Found 61.4%C; 5.6%H; 11.5%N; $C_{31}H_{30}ClN_5O.2HCl.\frac{1}{2}H_2O$ requires 61.4%C; 5.5%H; 11.6%N.

EXAMPLE 10

4-[p-(7-Chloro-4-quinolylamino)-benzamido]-1-methylpiperidine p-(7-Chloro-4-quinolylamino)-benzoyl chloride hydrochloride, (prepared as in Example 9 from 5.97 g. of the acid), was added in portions to a stirred, cooled mixture of 2.28 grams of 4-amino-1-methyl-piperidine and 21.2 grams of sodium carbonate in 150 millilitres of chloroform and 150 millilitres of water. After stirring overnight the insoluble material was removed by filtration, washed and dried to give 5.7 grams of the crude product. This was dissolved in hot methanol and filtered and addition of ethereal hydrogen chloride gave a crystalline product on cooling which was removed by filtration. Addition of ether to the filtrate gave 3.4 grams of the crude hydrochloride of the title compound. This was recrystallised from methanol/ether, and dissolved in water whence addition of 2N sodium hydroxide gave 2.5 grams of the title compound.

Melting point: 250.5°C with decomposition.

Analysis: Found. 66.2%C; 5.9%H; 14.0%N. $C_{22}H_{23}ClN_4O.\frac{1}{4}H_2O$ requires 66.1%C; 5.9%H; 14.0%N.

EXAMPLE 11

4-(p-[7-Chloro-4-quinolylamino]-benzmido)-1-phenethylpiperidine p-(7-Chloro-4-quinolylamino)-benzoyl chloride hydrochloride, (prepared as in Example 9 from 3.9 g. of the acid), was added in portions to a stirred, cooled mixture of 3.5 grams of 4-amino-1-phenethyl-piperidine dihydrochloride and 27 grams of sodium carbonate in 100 millilitres of water and 50 millilitres of chloroform. After stirring overnight at room temperature, the reaction mixture was filtered to give the crude product, which was then recrystallised from ethanolic hydrogen chloride to give 3.0 grams of the dihydrochloride monohydrate of the title compound.

Melting point: 287°–91°C with decomposition.

Analysis: found. 60.6%C; 5.6%H; 9.5%N; $C_{29}H_{29}ClN_4O.2HCl.H_2O$ requires 60.5%C; 5.8%H; 9.7%N.

EXAMPLE 12

4-[4-(7-Chloro-4-quinolylamino)-benzamido]-2,2,6,6-tetramethylpiperidine 9.66 Grams of 4-(7-chloro-4-quinolylamino)-benzoic acid were heated under reflux for five hours with 80 millilitres of thionyl chloride to generate the acid chloride hydrochloride. After the thionyl chloride had been removed on a rotary evaporator, the acid chloride hydrochloride was added, in portions, to a cooled, stirred mixture of 5.0 grams of 4-amino-2,2,6,6-tetramethylpiperidine and 35.4 grams of sodium carbonate in 150 millilitres of water and 150 millilitres of chloroform. After stirring overnight at room temperature, the reaction mixture was filtered and the insoluble material collected and washed with 400 millilitres of water. The residue was dried, then dissolved in hot ethanol and ethanolic hydrogen chloride added until the solution was acid. On cooling a crystalline solid separated and this gave, on washing with hot ethanol, 4.0 grams of the dihydrochloride monohydrate of the title compound.

Melting point: 260°–3°C with decomposition.

Analysis: found 56.9%C, 6.1%H, 10.5%N, $C_{25}H_{29}ClN_4O.2HCl.2H_2O$ requires 56.9%C, 6.3%H, 10.6%N.

EXAMPLE 13

3-[4-(7-Chloro-4-quinolylamino)-benzamido]-quinuclidine 4-(7-Chloro-4-quinolylamino)-benzoyl chloride hydrochloride, (prepared as in Example 12 from 7.40 grams of the acid), was added, in portions, to a cooled, stirred mixture of 5.0 grams of 3-aminoquinuclidine dihydrochloride and 27.0 grams of sodium carbonate in 100 millilitres of water and 100 millilitres of chloroform. After stirring overnight at room temperature the reaction mixture was filtered and the insoluble material washed with 400 millilitres of water. The residue was dried, dissolved in hot methanol, and any impurities filtered off from the hot solution. The filtrate was acidified with ethereal hydrogen chloride to give, as a yellow crystalline solid, 2.6 grams of the dihydrochloride dihydrate of the title compound.

Melting point: 255°–60°C with decomposition.

Analysis: found 53.7%C, 5.6%H, 10.7%N; $C_{23}H_{23}ClN_4O.2HCl.2H_2O$ requires 53.6%C, 5.7%N, 10.9%H.

EXAMPLE 14

1-Butyl-4-[4-(7-chloro-4-quinolylamino)-benzamido]-piperidine a. 15.5 Grams of 1-butyl-4-piperidone and 14.0 grams of hydroxylamine hydrochloride were mixed in 300 millilitres of ethanol and 150 millilitres of 30% sodium hydroxide solution, and heated under reflux for 30 minutes. On cooling, the reaction mixture was stirred vigorously as 20.0 grams of 50% nickel-aluminium alloy was added in the small portions. After stirring a further two hours, the mixture was filtered through kieselguhr and the ethanol was distilled from the filtrate on a rotary evaporator. The resulting two-phase mixture was extracted with 400 millilitres of ether, which was dried over magnesium sulphate and on evaporation yielded 11.0 grams of 4-amino-1-butyl-piperidine.

b. 4-(7-Chloro-4-quinolylamino)-benzoyl chloride hydrochloride, (prepared as in Example 12 from 14.9 grams of the acid), was added, in portions, to a cooled, stirred mixture of 7.80 grams of 4-amino-1-butyl-piperidine and 42.4 grams of sodium carbonate in 200 millilitres of water and 200 millilitres of chloroform. After stirring overnight at room temperature the reaction mixture was filtered giving a yellow residue, which was dissolved in hot ethanol, filtered, and the filtrate acidified with ethereal hydrogen chloride to give 11.5 grams of the dihydrochloride hemihydrate of the title compound as a yellow crystalline solid.

Melting point: 308°–12°C with decomposition.

Analysis: found 57.7%C, 6.1%H, 10.4%N; $C_{25}H_{29}ClN_4O.2HCl.½H_2O$ requires 57.9%C, 6.2%H, 10.8%N.

EXAMPLE 15

1-[4-(7-Chloro-4-quinolylamino)-benzoyl]-4-diethylamino-piperidine.

a. 11.6 Grams of 4-acetamido-1-benzyl-piperidine was dissolved in 150 millilitres of dry 1,2-dimethoxyethane and the solution added dropwise to a well-stirred suspension of 12.0 grams of lithium aluminium hydride in a further 150 millilitres of the same solvent. After heating the reaction mixture under reflux for 5 hours, 12.0 millilitres of water was added dropwise followed by 24.0 millilitres of 2N sodium hydroxide solution. Filtration and evaporation of the solvent gave 9.0 grams of crude 1-benzyl-4-ethylamino-piperidine.

b. 8.8 Grams of crude 1-benzyl-4-ethylamino-piperidine, 7.5 millilitres of bromoethane and 11.1 grams of triethylamine were stirred together, at room temperature, in 50 millilitres of dry dimethylformamide for 2 days. The reaction mixture was then poured into 200 millilitres of water, which was extracted with ether, and the ether fraction in turn extracted with 2N hydrochloric acid. The aqueous fraction was basified and extracted with ether, which was dried over magnesium sulphate and, on evaporation of the solvent, gave an oily liquid. This oil was dissolved in ethanol, and, on addition of ethanolic hydrogen chloride and ethyl acetate gave 9.5 grams of 1-benzyl-4-diethylamino-piperidine dihydrochloride as a white crystalline solid.

Melting point: 227°C.

Analysis: found 59.9%C, 8.8%H, 8.6%N; $C_{16}H_{26}N_2.2HCl$ requires 60.2%C, 8.9%H, 8.8%N.

c. 9.5 Grams of 1-benzyl-4-diethylamino-piperidine dihydrochloride was dissolved in 100 millilitres of 50% methanol/acetic acid, and was hydrogenated at 60 p.s.i. and 60°C in the presence of 1.0 gram of 10% palladium-on-charcoal catalyst. The resulting mixture was filtered while warm and dry ether added to the filtrate until it became cloudy. On cooling a small quantity of solid had separated and was filtered off. The solvent was distilled from the filtrate on a rotary evaporator, and the residue was recrystallised from ethanol/ether to give 5.1 grams of 4-diethylaminopiperidine dihydrochloride monohydrate.

Melting point: 219°C with decomposition.

Analysis: found 43.4%C, 9.4%H, 11.3%N; $C_9H_{10}N_2.2HCl.H_2O$ requires 43.7%C, 9.8%H, 11.3%N.

d. 4-(7-Chloro-4-quinolylamino)-benzoyl chloride hydrochloride, (prepared as in Example 12 from 5.97 grams of the acid), was added, in portions, to a cooled, stirred mixture of 4.94 grams of 4-diethylaminopiperidine dihydrochloride monohydrate and 42.4 grams of sodium carbonate in 200 millilitres of water and 200 millilitres of chloroform. After stirring overnight at room temperature the reaction mixture was filtered and the residue washed with chloroform. The combined chloroform fractions were washed with water, dried over magnesium sulphate, and evaporated to dryness to give a yellow foam. This was dissolved in hot ethanol, filtered hot, and addition of ethereal hydrogen chloride, followed by excess ether gave the crude hydrochloride of the title compound. This was stirred with 400 millilitres of water for two hours and then filtered. The filtrate was basified with 2N sodium hydroxide solution to give a white powder which was filtered off and recrystallised from ethanol/water to give 4.0 grams of the title compound.

Melting point: 204°–7°C.

Analysis: found 68.9%C, 6.8%H, 12.8%N; $C_{25}H_{29}ClN_4O$ requires 68.7%C, 6.7%H, 12.8%N.

EXAMPLE 16

3-[2-Chloro-4-(7-chloro-4-quinolylamino)-benzamido]-1-ethylpiperidine a. 29.5 Grams of 4,7-dichloroquinoline and 25.6 grams of 4-amino-2-chlorobenzoic acid were refluxed in 75 millilitres of glacial acetic acid for 10 minutes and then heated on a steam bath for a further 30 minutes. The resulting suspension was cooled and stirred into 500 ml. of 50% aqueous acetic acid. The solid was filtered, washed with water, dried, and recrystallised by dissolving in hot ethanol and 10 N sodium hydroxide, and neutralising at the boiling point with glacial acetic acid, to give 26.9 grams of 2-chloro-4-(7-chloro-4-quinolylamino)-benzoic acid monohydrate.

Melting point: 310°C with decomposition.

Analysis: found 55.0%C, 3.2%H, 7.7%N; $C_{16}H_{10}Cl_2N_2O_2.H_2O$ requires 54.7%C, 3.4%H, 8.0%N.

b. 6.66 Grams of 2-chloro-4-(7-chloro-4-quinolylamino)-benzoic acid were refluxed for four hours with 100 millilitres of thionyl chloride to give the acid chloride hydrochloride. After the excess thionyl chloride had been evaporated under reduced pressure, the acid chloride hydrochloride was added in portions to an ice-cooled mixture of 2.56 grams of 3-amino-1-ethylpiperidine and 21.5 grams of sodium carbonate in 50 millilitres of water and 500 millilitres of chloroform. The reaction mixture was stirred for seventeen hours at room temperature and filtered. The organic layer was separated, washed with water, dried over magnesium sulphate, and evaporated to give a yellow foam. This was crystallised from ethanol/water to give the title compound.

Melting point 248°C with decomposition.

Analysis: found 62.0%C, 5.5%H, 12.4%N; $C_{23}H_{24}Cl_2N_4O$ requires 62.3%C, 5.5%H, 12.6%N.

EXAMPLE 17

1-Butyl-4-[2-chloro-4-(7-chloro-4-quinolylamino)benzamido]piperidine

2-Chloro-4-(7-chloro-4-quinolylamino)-benzoyl chloride hydrochloride, (prepared as in Example 16a from 6.44 grams of the acid), was added in portions to a stirred, cooled mixture of 3.02 grams of 4-amino-1-butyl piperidine (prepared as in Example 14a), and 21.5 grams of sodium carbonate in 50 millilitres of chloroform and 50 millilitres of water. After stirring at room temperature overnight, and filtering, the organic layer was separated, washed with water, dried over magnesium sulphate and evaporated to give a foam. This was crystallised from ethanol/water to give the title compound.
Melting point: 209°C.
Analysis: found 61.5%C, 5.8%H, 11.3%N; $C_{25}H_{28}Cl_2N_4O.H_2O$ requires 61.3%C, 6.2%H, 11.45%N.

EXAMPLE 18

3-[3-(7-Chloro-4-quinolylamino)-benzamido]-1-ethylpiperidine a. 39.6 Grams of 4,7-dichloroquinoline and 27.43 grams of 3-aminobenzoic acid were refluxed in 120 millilitres of glacial acetic acid for four minutes and then were heated on a steam bath for a further 30 minutes. The resulting suspension was cooled and stirred into 250 millilitres of 50% aqueous acetic acid. The solid was filtered, dried, and recrystallised by dissolving in a mixture of hot ethanol and 10 N sodium hydroxide, and neutralising with glacial acetic acid at the boiling point, to give 50.2 grams of 3-(7-chloro-4-quinolylamino)-benzoic acid.
Melting point: 285°C with decomposition.
Analysis: found 64.0%C, 3.95%H, 9.4%N; $C_{16}H_{11}ClN_2O_2$ requires 64.3%C, 3.7%H, 9.4%N.

b. 5.98 Grams of 3-(7-chloro-4-quinolylamino)-benzoic acid were refluxed for two hours with excess thionyl chloride to give the acid chloride hydrochloride. After the thionyl chloride had been removed the acid chloride hydrochloride was added in portions to a cooled, stirred mixture of 2.56 grams of 3-amino-1-ethylpiperidine and 21.5 grams of sodium carbonate in 50 millilitres of chloroform and 50 millilitres of water. The reaction mixture was stirred at room temperature overnight and filtered. The organic layer was separated, washed with water, dried over magnesium sulphate, and evaporated to give a yellow foam. This was crystallised from 95% ethanol to give the title compound.
Melting point: 204°–6°C with decomposition.
Analysis: found 67.5%C, 6.2%H, 13.6%N; $C_{23}H_{25}ClN_4O$ requires 67.5%C, 6.2%H, 13.7%N.

EXAMPLE 19

1-(4-[7-Chloro-4-quinolylamino]-benzoyl)-4-phthalimidopiperidine a. 16.8 Grams of phthalic anhydride and 21.6 grams of 4-amino-1-benzyl-piperidine were stirred together while they were being heated in an oil bath at 150°C for 30 minutes. On cooling, thet resulting glassy solid was heated with 400 millilitres of methanol to give 26.5 grams of 1-benzyl-4-phthalimido piperidine.
Melting point: 154°–7°C.
Analysis: found 75.4%C, 6.4%H, 8.9%N; $C_{20}H_{20}N_2O_2$ requires 75.0%C, 6.3%H, 8.7%N.

b. 16.0 Grams of 1-benzyl-4-phthalimido-piperidine were dissolved in 200 millilitres of 50% methanol/acetic acid and 25 millilitres of ethereal hydrogen chloride, and were hydrogenated 60°C and 60 psi in the presence of 2.0 grams of 10% palladium-on-charcoal catalyst. After 4 hours the reaction mixture was filtered while still hot and addition of ether gave 8.7 grams of 4-phthalimido-piperidine monohydrochloride.
Melting point: 300°C with decomposition.
Analysis: found 58.5%C, 5.8%H, 10.5%N; $C_{13}H_{14}N_2O_2.HCl$ requires 58.5%C, 5.7%H, 10.5%N.

c. 4-(7-chloro-4-quinolylamino)benzoyl chloride hydrochloride (prepared as in Example 12 from 11.0 grams of the acid) was added, in portions, to a cooled stirred mixture of 9.6 grams of 4-phthalimido-piperidine hydrochloride and 42.4 grams sodium carbonate in 200 millilitres of water and 200 millilitres of chloroform. After stirring overnight at room temperature the reaction mixture was filtered to give a yellow solid, which was recrystallised from methanol to give 4.8 grams of the title compound.
Melting point: 226°–33°C.
Analysis: found 68.1%C, 4.7%H, 10.6%N; $C_{29}H_{23}ClN_4O_5$ requires 68.2%C, 4.5%H, 11.0%N.

EXAMPLE 20

4-(7-Chloro-4-quinolylamino)-N-(2-diethylaminoethyl)-benzamide 11.94 Grams of 4-(7-chloro-4-quinolylamino)-benzoic acid were heated under reflux for five hours with 100 millilitres of thionyl chloride to generate the acid chloride hydrochloride. After the thionyl chloride had been removed on a rotary evaporator, the acid chloride hydrochloride was added, in portions, to a cooled, stirred mixture of 6.4 grams of N,N-diethylethylene diamine and 42.4 grams of sodium carbonate in 200 millilitres of chloroform and 200 millilitres of water After stirring overnight at room temperature the mixture was filtered, and the residue was washed with water and dried. Then the residue was dissolved in hot ethanol, filtered hot, and on addition of ethereal hydrogen chloride and cooling a crystalline solid separated. This solid was dissolved in water, filtered and the filtrate basified with sodium carbonate. Filtration yielded the title compound as a pale yellow solid.
Melting point: 237°C.
Analysis: found 66.4%C, 6.5%H, 13.8%N; $C_{22}H_{25}ClN_4O$ requires 66.6%C, 6.4%H, 14.1%N.

EXAMPLE 21

4-(7-Chloro-4-quinolylamino)-N(2-[4-morpholino]-ethyl)-benzamide hydrate 4-(7-Chloro-4-quinolylamino)-benzoyl chloride hydrochloride (prepared as in Example 20 from 11.9 grams of the acid), was added in portions, to a cooled, stirred mixture of 5.2 grams 1-amino-2-(4-morpholino)-ethane and 42.4 grams of sodium carbonate in 200 millilitres of chloroform and 200 millilitres of water. After stirring overnight at room temperature the reaction mixture was filtered and the insoluble material washed with water. This residue was dried, dissolved in hot ethanol, filtered, and, on treatment with ethereal hydrogen chloride and cooling, gave a crystalline solid. This solid was dissolved in water, filtered, and basification of the filtrate gave a hydrate of the title compound.
Melting point: 230°C.
Analysis: found 62.4%C, 5.7%H, 12.9%N; $C_{22}H_{23}ClN_4O_2.¾H_2O$ requires 62.3%C, 5.8%H, 13.2%N.

EXAMPLE 22

4-Amino-1-[4-(7-chloro-4-quinolylamino)benzoyl]-piperidine 3.6 Grams of 1-[4-(7-chloro-4-quinolylamino)-benzoyl]-4-phthalimido-piperidine (which can be prepared in the manner described in Example 19) was refluxed with 0.35 millilitres of hydrazine hydrate in 25 millilitres of absolute ethanol for two hours. The volatile matter was removed on a rotary evaporator to give a gummy residue, which was treated with 100 millilitres of water, and acidified to pHl. A solid separated and was removed by filtration. The filtrate was basified with 2N—NaOH, and a finely divided solid separated and was filtered off. This was recrystallised from ethanol/water to give 1.4 grams of the title compound as the monohydrate.
Melting point: 193°C.
Analysis: found 63.0%C, 5.5%H, 13.8%N; $C_{21}H_{21}ClN_4O.H_2O$ requires 63.2%C, 5.8%H, 14.0%N.

EXAMPLE 23

1-[4-(7-Chloro-4-quinolylamino)-benzoyl]-3-dimethylaminopyrrolidine a. 12.6 Grams of p-toluenesulphonyl chloride were added in portions to a cooled stirred solution of 10.6 grams of 1-benzyl-3-hydroxy-pyrrolidine in 60 millilitres of dry pyridine and a catalytic amount of 4-dimethylaminopyridine. After stirring for three hours the reaction mixture was poured into water. The aqueous mixture was extracted with ether, which was then washed with water, dried over magnesium sulphate and evaporated off, leaving a red oil. This oil still contained pyridine, which was removed by azeotroping with 80-100 petrol, leaving 12.8 grams of crude 1-benzyl-3(p-toluenesulphonxy)-pyrrolidine.

b. 12.8 Grams of 1-benzyl-3-(p-toluenesulphonoxy)-pyrrolidine and 27 millilitres of 33% dimethylamine in ethanol were heated in 60 millilitres of methanol in a sealed bomb at 120°C for 20 hours. On cooling, the solvent was distilled off and the resulting oil was taken up in 2N-hydrochloric acid, filtered, basified and extracted with ether, which, on drying and evaporating, gave 6.8 grams of a pale yellow oil. This oil was dissolved in hot ethanol and addition of ethereal hydrogen chloride gave 5.6 grams of 1-benzyl-3-dimethylaminopyrrolidine dihydrochloride.
Analysis: found 56.6%C, 7.8%H, 10.2%N; $C_{13}H_{20}N_2.2HCl$ requires 56.3%C, 8.0%H, 10.1%N.

c. 5.5 Grams of 1-benzyl-3-dimethylamino-pyrrolidine dihydrochloride were dissolved in 100 millilitres of 50% methanol/acetic acid and hydrogenated in the presence of 0.6 grams of 10% palladium-on-charcoal at 50°C and 60 p.s.i. The reaction mixture was filtered, evaporated to dryness and the resulting oil crystallised from ethanol/ether to give 2.9 grams of 3-dimethylaminopyrrolidine dihydrochloride.
Analysis: found 38.4%C, 8.7%H, 14.7%N; $C_6H_{14}N_2.2HCl$ requires 38.5%C, 8.6%H, 15.0%N.

d. 4-(7-Chloro-4-quinolylamino)-benzoyl chloride hydrochloride, (prepared as in Example 20 from 5.97 grams of the acid), was added, in portions to a cooled, stirred mixture of 2.9 grams of 3-dimethylamino-pyrrolidine dihydrochloride and 31.8 grams of sodium carbonate in 150 millilitres of chloroform and 150 millilitres of water. After stirring overnight at room temperature, the reaction mixture was filtered, and the chloroform fraction was separated. The aqueous layer was washed with chloroform, and the combined chloroform fractions were dried over magnesium sulphate and evaporated to give 5.6 grams of yellow foam. This was dissolved in ethanol, and addition of ethereal hydrogen chloride gave 5.7 grams of the dihydrochloride hydrate of the title compound.
Melting point 286°C with decomposition.
Analysis: found 55.0%C, 5.5%H, 11.3 %N; $C_{22}H_{23}ClN_4O.2HCl.¾H_2O$ requires 54.9%C, 5.6%H, 11.6%N.

EXAMPLE 24

4-(7-Chloro-4-quinolylamino)-N-(1-diethylamino-4-pentyl)-benzamide 4-(7-Chloro-8-quinolylamino)-benzoyl chloride hydrochloride, (prepared as in Example 20 from 11.94 grams of the acid), was added, in portions to a cooled, stirred mixture of 6.33 grams of 4-amino-1-diethylamino-pentane and 42.4 grams of sodium carbonate in 200 millilitres of chloroform and 200 millilitres of water. After stirring overnight at room temperature, the reaction mixture was filtered and the chloroform layer was separated. The residue and the aqueous fraction were washed with chloroform, and the combined chloroform fraction was dried over magnesium sulphate and evaporated to give a yellow solid. This was recrystallised from ethyl acetate to give 10.3 grams of the title compound.
Melting point: 177°C
Analysis: found 68.5%C, 7.1%H, 12.5%N; $C_{25}H_{21}ClN_4O$ requires 68.4%C, 7.1%H, 12.8%N.

EXAMPLE 25

4-(7-Chloro-4-quinolylamino)-N-(1-ethyl-4-piperidyl)-benzamide 7.96 Grams of 4-(7-chloro-4-quinolylamino)-benzoic acid were heated under reflux for five hours with 70 millilitres of thionyl chloride to generate the acid chloride hydrochloride. After the thionyl chloride had been removed on a rotary evaporator, the acid chloride hydrochloride was added, in portions, to a cooled, stirred mixture of 2.7 grams of 4-amino-1-ethyl-piperidine and 31.8 grams of sodium carbonate in 150 millilitres of chloroform and 150 millilitres of water. After stirring overnight at room temperature the mixture was filtered and the residue was washed with water and dried. The residue was then dissolved in hot ethanol, ethereal hydrogen chloride was added, the solution was filtered, and addition of di-isopropyl ether gave a crystalline solid. This solid was partially dissolved in water, filtered, and the filtrate basified with sodium carbonate. Filtration yielded the dihydrate of the title compound as a colourless solid.
Melting point: 235°C.
Analysis: found C, 62.0%; H, 6.4%; N, 12.2%. $C_{23}H_{25}ClN_4O.2H_2O$ requires C, 62.1%; H, 6.6%; N, 12.6%.

EXAMPLE 26

3-Dimethylamino-1-[4-(7-chloro-4-quinolylamino)-benzoyl]-piperidine a. 11.6 Grams of 1-benzyl-3-chloro-piperidine hydrochloride and 100 millilitres of a 33% solution of dimethylamine in ethanol were heated in a bomb at 120°C. for 20 hours. After cooling volatile material was removed on a rotary evaporator, and the residual oil was mixed with 200 millilitres of water. The resulting solution was basified and extracted with three 100 millilitre portions of ether. The combined ether fractions were dried and evaporated to give 9.0 grams of an oil. This oil was dissolved in hot isopropanol and ethereal hydrogen chloride was added to give 9.3 grams of 1-benzyl-3-dimethylaminopiperidine dihydrochloride hemihydrate.

Analysis: found, C, 56.3%; H, 8.6%; N, 9.2%. $C_{14}H_{22}N_2 \cdot 2HCl \cdot \frac{1}{2}H_2O$ requires C, 56.0%; H, 8.4%; N, 9.3%.

b. 9.2 Grams of 1-benzyl-3-dimethylaminopiperidine dihydrochloride were dissolved in 100 millilitres of 50% methanol/acetic acid and hydrogenated in the presence of 0.5 grams of 10% palladium-on-charcoal at 55°C and 60 p.s.i. The reaction mixture was filtered, evaporated to dryness, and the resulting gum was dissolved in water and basified. Extraction of this solution with ether and removal of the solvent gave 1.5 grams of 3-dimethylamino piperidine as a colourless oil.

c. 4-(7-chloro-4-quinolylamino)benzoyl chloride hydrochloride, (prepared as in Example 25 from 3.48 grams of the acid), was added, in portions to a cooled, stirred mixture of 1.3 grams of 3-dimethylaminopiperidine and 10.5 grams of sodium carbonate in 75 millilitres of chloroform and 75 millilitres of water. After stirring overnight at room temperature the reaction mixture was filtered, the chloroform layer separated, washed with water, dried, and evaporated to give a foam. This was crystallized from ethyl acetate to give 1.4 grams of the title compound as its quarterhydrate.
Melting point 179°C.
Analysis: found, C, 67.1%; H, 6.3%; N, 13.2%. $C_{23}H_{25}ClN_4 O \cdot 1/4 H_2O$ requires C, 66.8%; H, 6.2%; N, 13.5%.

EXAMPLE 27

4-(7-chloro-4-quinolylamino)-N-(1-ethyl-3-piperidyl)-3-methoxy benzamide a. 11.8 Grams of 4,7-dichloroquinoline and 10.0 grams of 4-amino-3-methoxybenzoic acid were refluxed in 40 millilitres of glacial acetic acid for 10 minutes and then heated on a steam-bath for a further 30 minutes. The resulting suspension was poured into 150 millilitres of 50% aqueous acetic acid. Filtration gave 13.3 grams of 4-(7-chloro-4-quinolylamino)-3-methoxybenzoic acid as a pale yellow solid.

b. 13.3 Grams of 4-(7-chloro-4-quinolylamino)-3-methoxybenzoic acid were refluxed for 45 minutes with 90 millilitres of thionyl chloride to give the acid chloride hydrochloride. After the excess thionyl chloride had been evaporated under reduced pressure, the acid chloride hydrochloride was added in portions to a cooled mixture of 5.38 grams of 3-amino-1-ethylpiperidine and 45 grams of sodium carbonate in 110 millilitres of water and 110 millilitres of chloroform. The reaction mixture was stirred overnight at room temperature and filtered. The chloroform layer was separated, washed with water, dried, and evaporated to give a yellow foam. This was crystallized from ethyl acetate to give the title compound.
Melting point 178°C.
Analysis: found, C, 65.8%; H, 6.3%, N, 12.4%. $C_{24}H_{27}ClN_4O_2$ requires C, 65.7%; H, 6.2%; N, 12.8%.

EXAMPLE 28

4-(7-Trifluoromethyl-4-quinolylamino)-N-(1-ethyl-4-piperidyl)benzamide 4-(7-Trifluoromethyl-4-quinolylamino)-benzoyl chloride hydrochloride (0.02 moles) and 3-amino-1-ethylpiperidine (0.02 moles) are reacted in a similar manner to that described in Example 1 to give the title compound.

EXAMPLE 29

1-[4-(7-Chloro-4-quinolylamino)-benzoyl]-3-piperidinopiperidine 4-(7-Chloro-4-quinolylamino)-benzoyl chloride hydrochloride (0.02 moles) and 3-piperidinopiperidine (0.02 moles) are reacted in a similar manner to that described in Example 26(c) to give the title compound.

EXAMPLE 30

4-(7-Chloro-4-quinolylamino)-N-ethyl-N-(1-ethyl-3-piperidyl) benzamide 4-(7-Chloro-4-quinolylamino) benzoyl chloride hydrochloride (0.02 moles) and 3-ethylamino-1-ethyl piperidine (0.02 moles) are reacted in a similar manner to that described in Example 3 to give the title compound.

EXAMPLE 31

4-(7-Chloro-4-quinolylamino)-N-(1-ethyl-3-piperidyl)-3-methylbenzamide a. 4,7-Dichloroquinoline (0.05 moles) and 4-amino-3-methylbenzoic acid (0.05 moles) are reacted in a similar manner to that described in Example 27(a) to give 4-(7-chloro-4-quinolylamino)-3-methylbenzoic acid.

b. 4-(7-Chloro-4-quinolylamino)-3-methylbenzoic acid (0.02 moles) and 3-amino-1-ethylpiperidine (0.02 moles) are reacted in a similar manner to that described in Example 27(a) to give the title compound.

We claim:
1. A compound selected from the group consisting of bases having the formula

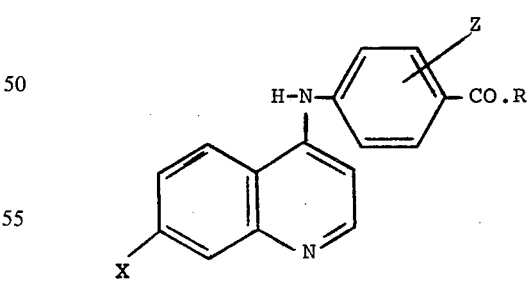

or

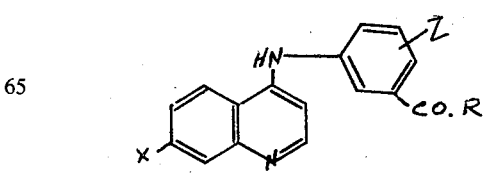

and the acid addition salts of such bases with pharmaceutically acceptable acids, wherein X is a member of the group consisting of halogen and trifluoromethyl, Z is a member of the group consisting of hydrogen, chlorine, methoxy and methyl, and R is a member of the group consisting of

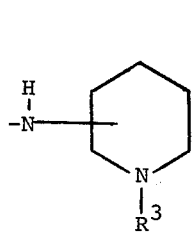 and 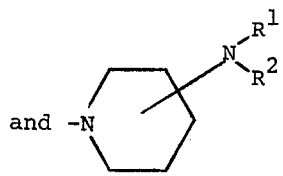

in which each of $R^1$, $R^2$ and $R^3$ is an alkyl group having from one to four carbon atoms.

2. A compound according to claim 1, which is 3-[p-(7-chloro-4-quinolylamino)benzamido]-1-ethyl-piperidine or a pharmaceutical acceptable acid addition salt thereof.

3. A compound according to claim 1, which is 1-[p-(7-chloro-4-quinolylamino)-benzoyl]-4-dimethylamino piperidine or a pharmaceutically acceptable acid addition salt thereof.

4. A compound according to claim 1, which is 4-[p-(7-chloro-4-quinolylamino)-benzamido]-1-methyl-piperidine or a pharmaceutically acceptable acid addition salt thereof.

5. A compound according to claim 1, which is 1-butyl-4-[4-(7-chloro-4-quinolylamino)-benzamido]-piperidine or a pharmaceutically acceptable acid addition salt thereof.

6. A compound according to claim 1, which is 1-[4-(7-chloro-4-quinolylamino)-benzoyl]-4-diethylaminopiperidine or a pharmaceutically acceptable acid addition salt thereof.

7. A compound according to claim 1, which is 3-[2-chloro-4-(7-chloro-4-quinolylamino)-benzamido]-1-ethylpiperidine or a pharmaceutically acceptable acid addition salt thereof.

8. A compound according to claim 1, which is 1-butyl-4-[2-chloro-4-(7-chloro-4-quinolylamino)benzamido]piperidine or a pharmaceutically acceptable acid addition salt thereof.

9. A compound according to claim 1, which is 3-[3-(7-chloro-4-quinolylamino)-benzamido]-1-ethylpiperidine or a pharmaceutically acceptable acid addition salt thereof.

10. A compound according to claim 1, which is 4-(7-chloro-4-quinolylamino)-N-(1-ethyl-4-piperidyl)benzamide or a pharmaceutically acceptable acid addition salt thereof.

11. A compound according to claim 1, which is 3-dimethylamino-1-[4-(7-chloro-4-quinolylamino)benzoyl]-piperidine or a pharmaceutically acceptable acid addition salt thereof.

12. A compound according to claim 1, which is 4-(7-chloro-4-quinolylamino)-N-(1-ethyl-3-piperidyl)-3-methoxy benzamide or a pharmaceutically acceptable acid addition salt thereof.

* * * * *